UNITED STATES PATENT OFFICE.

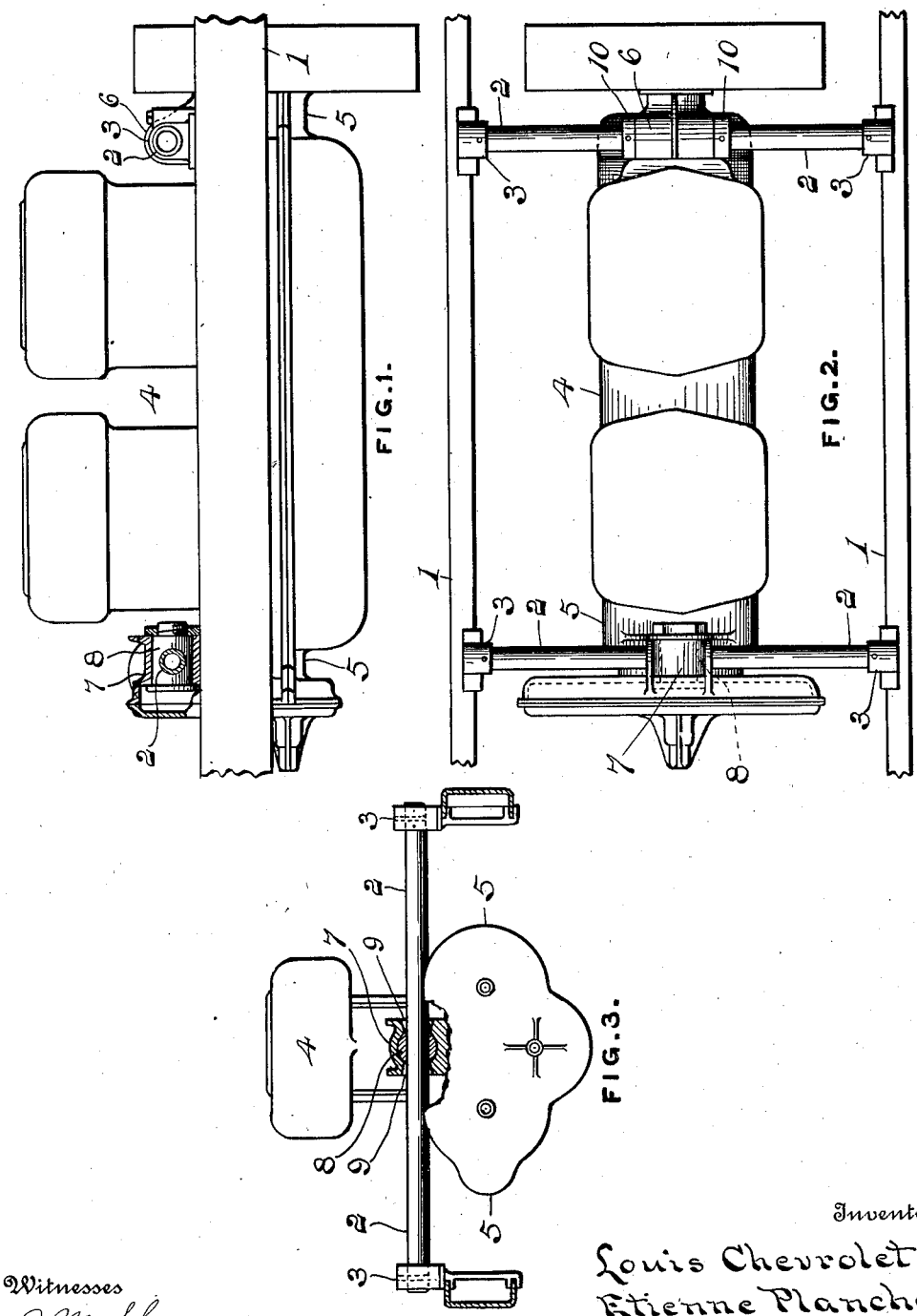

LOUIS CHEVROLET AND ETIENNE PLANCHE, OF DETROIT, MICHIGAN, ASSIGNORS TO CHEVROLET MOTOR COMPANY, OF DETROIT, MICHIGAN, A CORPORATION OF MICHIGAN.

MOTOR-SUSPENSION MECHANISM.

1,088,124.  Specification of Letters Patent.  Patented Feb. 24, 1914.

Application filed September 21, 1911. Serial No. 650,552.

*To all whom it may concern:*

Be it known that we, LOUIS CHEVROLET, a citizen of the Republic of Switzerland, and ETIENNE PLANCHE, a citizen of the Republic of France, both residing at Detroit, in the county of Wayne and State of Michigan, have invented certain new and useful Improvements in Motor-Suspension Mechanism, of which the following is a specification, reference being had therein to the accompanying drawings.

This invention relates to an improved motor suspension mechanism for automobiles and its object is to so support a motor as to permit a free movement of the chassis upon which it is supported without putting undue strain upon the motor casing or its shaft bearings and so that the motor will be supported at all times in perfect alinement with the power transmitting mechanism and other parts of the automobile.

To this end the invention consists in supporting the motor at its ends by bearings located above the center of gravity of the motor in the vertical plane of its longitudinal axis, in such a manner as to permit said motor to turn upon a transverse axis at one end and to turn at its opposite end upon both longitudinal and transverse axes, and further, in providing certain other new and useful features in the construction and arrangement of parts, all as hereinafter more fully described and more particularly pointed out in the claims, reference being had to the accompanying drawings in which—

Figure 1 is a side elevation of a motor supported in operative position upon an automobile chassis by mechanism embodying the invention, parts being broken away to show the construction; Fig. 2 is a plan view of the same; and Fig. 3 is a front end elevation, with parts broken away to show the construction.

As shown in the drawing, 1, 1 are the side channel members of the automobile chassis and 2, 2 are tubular cross-members rigidly secured at their ends in bearing brackets 3 secured to and extending upward from the said side members. A multiple cylinder motor 4 of the vertical type and any desired construction, is supported with its longitudinal axis in the vertical plane of the longitudinal center-line of the chassis by said cross-members 2. The crank case or lower portion 5 of the motor is formed with a bearing 6 extending upwardly therefrom at its rear end to receive one of the tubular cross-members and at the forward end of the crank case on its upper side is a bearing 7 to receive a bearing member 8 adapted to turn therein upon an axis extending longitudinally of the motor and chassis. This bearing member is formed with a transverse hole to receive the forward tubular member 2 which is free to turn therein and extends loosely through openings 9 in the sides of the bearing 7. These openings 9 are of a size to permit the tubular members to rock in the bearing upon the longitudinal axis of the bearing 8, said member turning with it in the bearing when, owing to unevenness in the road or other cause, one of the frame members 1 is raised relative to the other at its forward end. The engine being supported at its rear end by the rear cross member 2 passing through said bearing, is free to turn upon the axis of said member and it is prevented from shifting laterally upon said tubular member by collars 10 on the said member engaging the ends of the bearing. The members 2 extend across the frame above the crank case of the motor and thus said motor is supported at a point above its longitudinal center of gravity, which arrangement tends to hold the engine in an upright position.

Upon warping or distortion of the chassis, the motor is relieved of torsional strains by being suspended from the two cross members by two bearings only, which bearings are located in the vertical axial plane of the engine at the longitudinal center line thereof, and it is further relieved of strains and permitted to preserve its alinement with power transmitting mechanism and other parts (not shown) by being supported to turn upon a transverse axis at its rear end and to turn upon both longitudinal and transverse axes at its forward end.

Obviously, changes in the details of construction may be made without departing from the spirit of the invention and we do not wish to limit ourselves to the particular construction or arrangement of parts shown or described.

Having thus fully described our invention what we claim is:—

1. The combination of a chassis having transverse members, a motor extending longitudinally of said chassis, a bearing on the motor at one end thereof above its center of gravity through which one of said transverse members extends and upon which the bearing is adapted to turn, collars on the transverse member at the ends of the bearing to prevent lateral movement of the motor upon said member, a bearing on the motor at the opposite end thereof above the center of gravity of the motor, and a bearing member rotatable in said bearing upon an axis extending longitudinally of the motor, said bearing member being formed with a transverse opening within which one of the transverse members of the chassis is adapted to turn.

2. The combination of a chassis, transverse tubular members on the chassis, a motor between said members and its ends adjacent thereto, a bearing at one end of the motor above the center of gravity thereof to receive one of the tubular members upon which it is adapted to turn, a bearing having lateral openings at the opposite end of the motor above the center of gravity of the motor, and a rotatable bearing member in the last named bearing adapted to turn upon an axis extending longitudinally of the motor and having a transverse opening opposite the lateral openings in the bearing to receive one of the transverse tubular members which extends loosely through said openings in the bearing and is free to turn within the bearing member.

3. The combination of a chassis having transverse members, a motor extending longitudinally of said chassis, a bearing on the motor at one end thereof through which one of said transverse members extends and upon which the bearing is adapted to turn, means at the ends of said bearing to prevent lateral movement of the motor upon said member, a bearing on the motor at the opposite end thereof, and a bearing member rotatable in said bearing upon an axis extending longitudinally of the motor, said bearing member being formed with a transverse opening within which one of the transverse members of said chassis is adapted to turn.

4. In a suspension device for motors, the combination with a chassis, of transverse members detachably supported upon said chassis, a motor extending longitudinally of said chassis, a bearing at one end of said motor movably supported by one of said members against longitudinal displacement upon said member, a bearing carried by said motor at the opposite end thereof, and means loosely mounted upon the other of said transverse members within said last named bearing and allowing the end of said motor to swing transversely in an arc.

In testimony whereof we affix our signatures in presence of two witnesses.

LOUIS CHEVROLET.
ETIENNE PLANCHE.

Witnesses:
Lewis E. Flanders,
A. M. Shannon.